(12) United States Patent
Huang et al.

(10) Patent No.: US 11,397,724 B2
(45) Date of Patent: Jul. 26, 2022

(54) METHOD AND APPARATUS FOR OBTAINING AREA SPEED LIMIT VALUE AND TERMINAL DEVICE

(71) Applicant: BYD COMPANY LIMITED, Shenzhen (CN)

(72) Inventors: Chugao Huang, Shenzhen (CN); Kaikuo Zhuo, Shenzhen (CN); Faping Wang, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 223 days.

(21) Appl. No.: 16/638,083

(22) PCT Filed: May 2, 2018

(86) PCT No.: PCT/CN2018/085294
§ 371 (c)(1),
(2) Date: Feb. 10, 2020

(87) PCT Pub. No.: WO2019/029199
PCT Pub. Date: Feb. 14, 2019

(65) Prior Publication Data
US 2020/0174994 A1    Jun. 4, 2020

(30) Foreign Application Priority Data

Aug. 11, 2017 (CN) .......................... 201710687147.6

(51) Int. Cl.
*G06F 16/23* (2019.01)
*G06F 16/2455* (2019.01)
(Continued)

(52) U.S. Cl.
CPC ........ *G06F 16/2365* (2019.01); *B61L 25/025* (2013.01); *B61L 27/70* (2022.01); *G06F 16/2455* (2019.01)

(58) Field of Classification Search
CPC .. G06F 16/2365; G06F 16/2455; G06F 16/29; B61L 25/025; B61L 27/0005; B61L 3/008; G06Q 50/30; G08G 1/01
See application file for complete search history.

(56) References Cited

U.S. PATENT DOCUMENTS

2010/0094551 A1* 4/2010 Bonanni ............... B61L 25/025
                                                          701/469
2010/0241296 A1* 9/2010 Rhea, Jr. .................. B61L 27/04
                                                           701/20

(Continued)

FOREIGN PATENT DOCUMENTS

CN    101746396 A    6/2010
CN    102184642 A    9/2011

(Continued)

OTHER PUBLICATIONS

The World Intellectual Property Organization (WIPO) International Search Report for PCT/CN2018/085294 dated Jul. 26, 2018 6 Pages.

(Continued)

*Primary Examiner* — Albert M Phillips, III
(74) *Attorney, Agent, or Firm* — Anova Law Group, PLLC (57) ABSTRACT

The present disclosure provides a method for obtaining an area speed limit value. The method includes: mapping, to a coordinate system, a track section on a train running line in electronic map data; respectively storing, into a temporary speed limit information list and a constant speed limit information list in a one-to-one correspondence mode, speed limit data of a temporary speed limit and speed limit data of a constant speed limit of the train in the track section according to coordinates of the track section in the coordinate system; combining speed limit data in the temporary speed limit information list with speed limit data in the (Continued)

constant speed limit information list to obtain a strictest speed limit list of the train; and obtaining, by searching the strictest speed limit list, a strictest speed limit value of an area corresponding to a real-time coordinate position of the train.

9 Claims, 6 Drawing Sheets

(51) Int. Cl.
    *B61L 25/02*     (2006.01)
    *B61L 27/70*     (2022.01)

(56) References Cited

U.S. PATENT DOCUMENTS

| | | |
|---|---|---|
| 2014/0297167 A1 | 10/2014 | Duan et al. |
| 2017/0327138 A1 | 11/2017 | Jordan et al. |

FOREIGN PATENT DOCUMENTS

| | | |
|---|---|---|
| CN | 102267481 A | 12/2011 |
| CN | 104691580 A | 6/2015 |
| CN | 105383520 A | 3/2016 |
| CN | 106504164 A | 3/2017 |
| CN | 107886461 A | 4/2018 |
| WO | 2015049064 A1 | 4/2015 |

OTHER PUBLICATIONS

Binghao Wu, "Method of Displaying for Temporary Speed Restriction Message Using Feature Point", Railway Signalling & Communication Engineering, Beijing, vol. 6 No. 2 Apr. 30, 2009 p. 47-50.

Zeng Lin et al, "Based on CPN to verify data fusion method of high speed railway TSR", Journal of Beijing Jiaotong University, vol. 36 No. 3, Jun. 2012 p. 41-46.

Xiao Liu et al, "Simulation Study on Automatic Train Protection of CTCS-3 Train Control System in the view of generating the speed protection curve", Railway Signalling & Communication, vol. 49 No. 6. Jun. 30, 2013 p. 9-13.

Faping Wang, "Big Challenges of Vehicle Communication and Application", 2015 IEEE 4th Asia-Pacific Conference on Antennas and Propagation Dec. 31, 2015 p. 380-383.

Wanli Jiao, "Research and Implementation of CBTC Train Management Simulation System Data Management", China Excellent Master Degree Thesis Full-text Database—Engineering Technology II edit, vol. 10 Oct. 15, 2012 p. 5, 17-19, 50-52.

Li Zhang, "Train Automatic Control System Equipment Maintenance", Xi'an Jiaotong University Press, Chengdu, Oct. 30, 2013 p. 260.

Ning Guo, "Research On the Automatic Train Protection Simulation System of CTCS2", China Excellent Master Degree Thesis Full-text Database—Engineering Technology II edit, vol. 12 Dec. 15, 2008 p. 1-66.

* cited by examiner

METHOD AND APPARATUS FOR OBTAINING AREA SPEED LIMIT VALUE AND TERMINAL DEVICE

CROSS-REFERENCE TO RELATED APPLICATIONS

This application is a national phase entry under 35 U.S.C. § 371 of International Application No. PCT/CN2018/085294, filed on May 2, 2018, which claims the priority to Chinese Patent Application No. 201710687147.6 filed by BYD Company Limited on Aug. 11, 2017 content of all of which is incorporated herein by reference in its entirety.

FIELD

This application relates to the technical field of track traffic and, in particular, to a method and apparatus for obtaining an area speed limit value and a terminal device.

BACKGROUND

In an existing related traffic control solution, a constant speed limit and a temporary speed limit of a line are used as two speed limit information sources, and a speed limit value is determined according to whether temporary speed limit information is received to be used to calculate a currently allowable speed and a protection curve. In addition, in the related existing solution, position information of the constant speed limit and the temporary speed limit of the line is described in a form of electronic map data, that is, a specific position of a point is represented using a track identifier (ID) and a track offset.

In this way, when a plurality of pieces of temporary speed limit data is processed, the protection curve is calculated through description of the electronic map, and a query interface of the electronic map is frequently invoked, leading to complex logical processing and low program efficiency.

SUMMARY

The present disclosure is intended to resolve at least one of technical problems in related art to some extent.

Therefore, a first objective of the present disclosure is to provide a method for obtaining an area speed limit value, so that a plurality of pieces of temporary speed limit data is combined into a strictest speed limit list at one time, thereby simplifying logical processing of electronic map data query, and improving program efficiency.

A second objective of the present disclosure is to provide an apparatus for obtaining an area speed limit value.

A third objective of the present disclosure is to provide a terminal device.

A fourth objective of the present disclosure is to provide a non-transitory computer readable storage medium.

A fifth objective of the present disclosure is to provide a computer program product.

In order to achieve the foregoing objectives, an embodiment in a first aspect of the present disclosure provides a method for obtaining an area speed limit value. The method includes: preprocessing electronic map data, and mapping, to a coordinate system, a track section on a train running line in the electronic map data; respectively storing, into a temporary speed limit information list and a constant speed limit information list in a one-to-one correspondence mode, speed limit data of a temporary speed limit and speed limit data of a constant speed limit of the train in the track section according to coordinates of the track section in the coordinate system; combining speed limit data in the temporary speed limit information list with speed limit data in the constant speed limit information list to obtain a strictest speed limit list of the train; and obtaining, by searching the strictest speed limit list, a strictest speed limit value of an area corresponding to a real-time coordinate position of the train.

In the method for obtaining an area speed limit value according to the embodiment of the present disclosure, the electronic map data is processed, and the track section on the train running line in the electronic map data is mapped to the coordinate system. Afterwards, the speed limit data of the temporary speed limit and speed limit data of the constant speed limit of the train in the track section is respectively stored into the temporary speed limit information list and the constant speed limit information list in a one-to-one correspondence mode according to the coordinates of the track section in the coordinate system. The speed limit data in the temporary speed limit information list is combined with the speed limit data in the constant speed limit information list to obtain a strictest speed limit list of the train. Finally, a strictest speed limit value of an area corresponding to a real-time coordinate position of the train is obtained by searching the strictest speed limit list. Therefore, a plurality of pieces of temporary speed limit data may be combined into the strictest speed limit list at one time, and it is neither required to concern whether a temporary speed limit packet is received, nor required to directly query the electronic map, thereby reducing complexity of logical processing, and improving program efficiency.

In order to achieve the foregoing objectives, an embodiment in a second aspect of the present disclosure provides an apparatus for obtaining an area speed limit value. The apparatus includes: a mapping module configured to: preprocess electronic map data, and map, to a coordinate system, a track section on a train running line in the electronic map data; a storing module configured to respectively store, into a temporary speed limit information list and a constant speed limit information list in a one-to-one correspondence mode, speed limit data of a temporary speed limit and speed limit data of a constant speed limit of the train in the track section according to coordinates of the track section in the coordinate system; a combining module configured to combine speed limit data in the temporary speed limit information list with speed limit data in the constant speed limit information list to obtain a strictest speed limit list of the train; and an obtaining module configured to obtain, by searching the strictest speed limit list obtained from the combining module, a strictest speed limit value of an area corresponding to a real-time coordinate position of the train.

In the apparatus for obtaining an area speed limit value according to the embodiment of the present disclosure, the mapping module preprocesses the electronic map data, and maps, to the coordinate system, the track section on the train running line in the electronic map data. Afterwards, the storing module respectively stores, into the temporary speed limit information list and the constant speed limit information list in a one-to-one correspondence mode, speed limit data of the temporary speed limit and speed limit data of the constant speed limit of the train in the track section according to coordinates of the track section in the coordinate system. The combining module combines speed limit data in the temporary speed limit information list and speed limit data in the constant speed limit information list to obtain a strictest speed limit list of the train. Finally, the obtaining module obtains, by searching the strictest speed limit list, a strictest speed limit value of an area corresponding to a real-time coordinate position of the train. Therefore, a plurality of pieces of temporary speed limit data may be combined into the strictest speed limit list at one time, and it is neither required to concern whether a temporary speed limit packet is received, nor required to directly query the electronic map, thereby reducing complexity of logical processing, and improving program efficiency.

In order to achieve the foregoing objectives, an embodiment in a third aspect of the present disclosure provides a terminal device disposed on a train. The terminal device includes a memory, a processor and a computer program stored on the memory and capable of running on the processor, when the processor executes the computer program, the foregoing method being implemented.

In order to achieve the foregoing objectives, an embodiment in a fourth aspect of the present disclosure provides a non-temporary computer readable storage medium storing a computer program thereon, when the computer program is executed by a processor, the foregoing method being implemented.

In order to achieve the foregoing objectives, an embodiment in a fifth aspect of the present disclosure provides a computer program product, when an instruction in the computer program product is executed by a processor, the foregoing method being performed.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where.

DETAILED DESCRIPTION

Embodiments of the present disclosure are described in detail below, and examples of the embodiments are shown in the accompanying drawings, where the same or similar elements having same or similar functions are denoted by the same or similar reference numerals throughout the descriptions. The embodiments described below with reference to the accompanying drawings are exemplary and used for explaining the present disclosure, and should not be construed as a limitation on the present disclosure.

Figure 1:
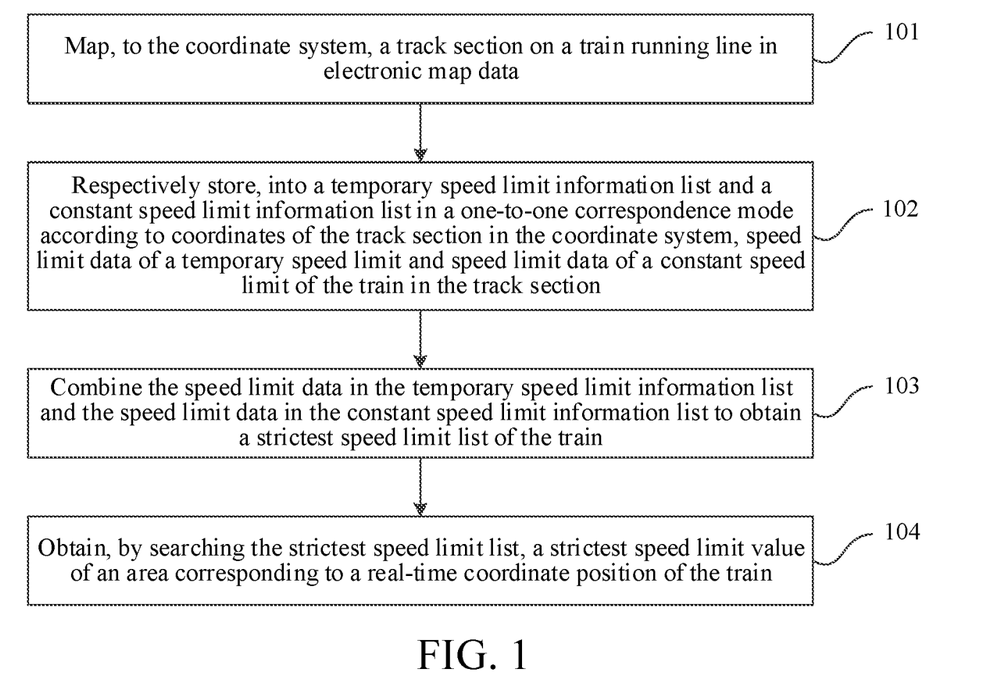
FIG. 1 is a flowchart of a method for obtaining an area speed limit value according to an embodiment of the present disclosure.

FIG. 1 is a flowchart of a method for obtaining an area speed limit value according to an embodiment of the present disclosure. As shown in FIG. 1, the method for obtaining the area speed limit value may include:

Step 101: A track section on a train running line in electronic map data is mapped to a coordinate system.

In an embodiment of the present invention, the electronic map data may be acquired and at least one element that is related to the train running line and that is in the electronic map data may be mapped to the coordinate system. In particular, the element related to the train running line may include a track section. In another embodiment of the present invention, the element related to the train operation line may further include elements such as a transponder, a station, an electricity-free area, a line speed limit and a signal machine, etc.

In an embodiment of the present invention, that a track section on a train running line in electronic map data is mapped to a coordinate system includes: selecting a track section as a reference track of the coordinate system; determining a train running direction (that is, uplink or downlink) as a positive direction of the coordinate system; acquiring a specified quantity of track sections in front according to a track link relationship in the electronic map data, and calculating a starting coordinate value of each track section according to a length of the track section and the track link relationship using a starting end position of the reference track as an origin of the coordinate system. In an embodiment of the present invention, for other elements related to the train running line, starting coordinate systems, lengths, and element IDs of the other elements may be calculated according to offsets of the other elements relative to the track section, to generate an information list of all elements related to the train running line, so that the electronic map data is mapped to the coordinate system.

In addition, after the track section on the train running line in the electronic map data is mapped to the coordinate system, a related information list is further generated. The related information list includes a track section list, a temporary speed limit information list, a constant speed limit information list, and a strictest speed limit list, which are introduced below respectively.

a. The track section list includes information such as coordinates, track section IDs, and track lengths of all track sections on the train running line. Each element in the list is represented in a form of (starting point coordinates of the track section, a track length, a track section ID, and a track attribute).

Example 1: A track section list {{0, 8600, 0x01000002, TRACK_UP}, {58200, 8600, 0x01000006, TRACK_STATION}} includes two track section elements. The track section element {0, 8600, 0x01000002, TRACK_UP} represents that a starting point coordinate of a track section is 0 cm, a track length is 8600 cm, a track section ID is 0x01000002, and a track attribute is an uplink track, the track starting point coordinate 0 representing that the track is a starting track of the coordinate system, and a starting point of the track section being an origin or a zero point of the coordinate system. The track section element {58200, 8600, 0x01000006, TRACK_STATION} represents that a starting point coordinate of the track section is 58200 cm, that is, a distance from the origin of the coordinate system is 58200 cm, a track length is 8600 cm, a track section ID is 0x01000006, and a track attribute is a station track.

b. The constant speed limit information list includes information such as speed limit area coordinates and speed limit values of all track sections on the train running line. The information is represented in a form of (starting point coordinates of a speed limit area, a length of a speed limit area, a speed limit value, and a reserved field).

Example 2: A constant speed limit information list {{0, 58200, 2200, 0}, {58200, 14300, 1080, 0}} includes two constant speed limit elements. The constant speed limit element {0, 58200, 2200, 0} represents that a starting point coordinate of a speed limit area is 0 cm, a length of the speed limit area is 58200 cm, a speed limit value of the speed limit area is 2200 cm/s, and a reserved field is 0 by default. The constant speed limit element {58200, 14300, 1080, 0} represents that a starting point coordinate of the speed limit area is 58200 cm, a length of the speed limit area is 14300 cm, a speed limit value of the speed limit area is 1080 cm/s, and a reserved field is 0 by default.

c. The temporary speed limit information list includes information such as received temporary speed limit area coordinates and temporary speed limit values. The information is represented in a form of (starting point coordinates of a temporary speed limit area, a length of the temporary speed limit area, a temporary speed limit value, and a reserved field).

Example 3: A temporary speed limit information list {{8200, 50000, 1860, 0}, {58200, 4300, 1120, 0}} includes two temporary speed limit elements. The temporary speed limit element {8200, 50000, 1860, 0} represents that a starting point coordinate of a temporary speed limit area is 8200 cm, a length of the temporary speed limit area is 50000 cm, a speed limit value of the temporary speed limit area is 1860 cm/s, and a reserved field is 0 by default. The temporary speed limit element {58200, 4300, 100, 0} represents that a starting point coordinate of the temporary speed limit region is 58200 cm, a length of the temporary speed limit area is 4300 cm, a speed limit value of the temporary speed limit area is 1080 cm/s, and a reserved field is 0 by default.

d. The strictest speed limit list includes information such as a minimum speed limit value taken from temporary speed limit data and line constant speed limit data and corresponding speed limit area coordinates of the minimum speed limit value. The information is represented in a form of (starting point coordinates of a strictest speed limit area, a length of the strictest speed limit area, a strictest speed limit value, and a reserved field).

Example 4: A strictest speed limit list {{0, 8200, 2200, 0}, {8200, 50000, 1860, 0}} includes two strictest speed limit elements. {0, 8200, 2200, 0} represents that a starting point coordinate of a strictest speed limit area is 0 cm, a length of the strictest speed limit area is 8200 cm, a speed limit value of the strictest speed limit area is 2200 cm/s, and a reserved field is 0 by default. {58200, 14300, 1080, 0} represents that a starting point coordinate of the strictest speed limit area is 8200 cm, a length of the strictest speed limit area is 50000 cm, a speed limit value of the strictest speed limit area is 1860 cm/s, and a reserved field is 0 by default. The strictest speed limit list may be a combined speed limit list, and used to include information such as a minimum speed limit value taken from the temporary speed limit data and the constant speed limit data of a line and corresponding speed limit area coordinates of the minimum speed limit value.

Step 102: The speed limit data of a temporary speed limit and the speed limit data of a constant speed limit of the train in the track section is respectively stored into the temporary speed limit information list and the constant speed limit information list in a one-to-one correspondence mode according to coordinates of the track section in the coordinate system.

The coordinate of the track section in the coordinate system is represented in a form of (starting point coordinates of the track section, a track length, a track section ID, and a track attribute) of the track section in a track section list.

In this embodiment, the speed limit data of the temporary speed limit and the speed limit data of the constant speed limit of the track section are respectively stored into a temporary speed limit information list and a constant speed limit information list in a representation form of a coordinate system element.

A coordinate system element of the speed limit data in the temporary speed limit information list is represented in a form of (a starting point coordinate of the temporary speed limit area, a length of the temporary speed limit area, a temporary speed limit value, and a reserved field).

A coordinate system element of the speed limit data in the constant speed limit information list is represented in a form of (starting point coordinates of the speed limit area, a length of the speed limit area, a speed limit value, and a reserved field).

Step 103: Speed limit data in the temporary speed limit information list and speed limit data in the constant speed limit information list are combined to obtain a strictest speed limit list of the train.

Step 104: A strictest speed limit value of an area corresponding to a real-time coordinate position of the train is obtained by searching the strictest speed limit list.

In one embodiment, after the strictest speed limit list of the train is obtained, the strictest speed limit value of the area corresponding to the real-time coordinate position may be obtained according to the real-time coordinate position of the train, and a speed limit value of a safety protection curve of the train may be further obtained by calculating according to the obtained strictest speed limit value.

In the method for obtaining an area speed limit value, the electronic map data is preprocessed, and the track section on the train running line in the electronic map data is mapped to the coordinate system. Afterwards, the speed limit data of the temporary speed limit and speed limit data of the constant speed limit of the train in the track section is respectively stored into the temporary speed limit information list and the constant speed limit information list in a one-to-one correspondence mode according to the coordinates of the track section in the coordinate system. The speed limit data in the temporary speed limit information list and the speed limit data in the constant speed limit information list are combined to obtain a strictest speed limit list of the train. Finally, a strictest speed limit value of an area corresponding to a real-time coordinate position of the train is obtained by searching the strictest speed limit list. Therefore, a plurality of temporary speed limit data may be combined into the strictest speed limit list at one time, it is neither required to concern whether a temporary speed limit packet is received, nor required to directly query the electronic map, thereby reducing complexity of logical processing, and improving program efficiency.

Figure 2:
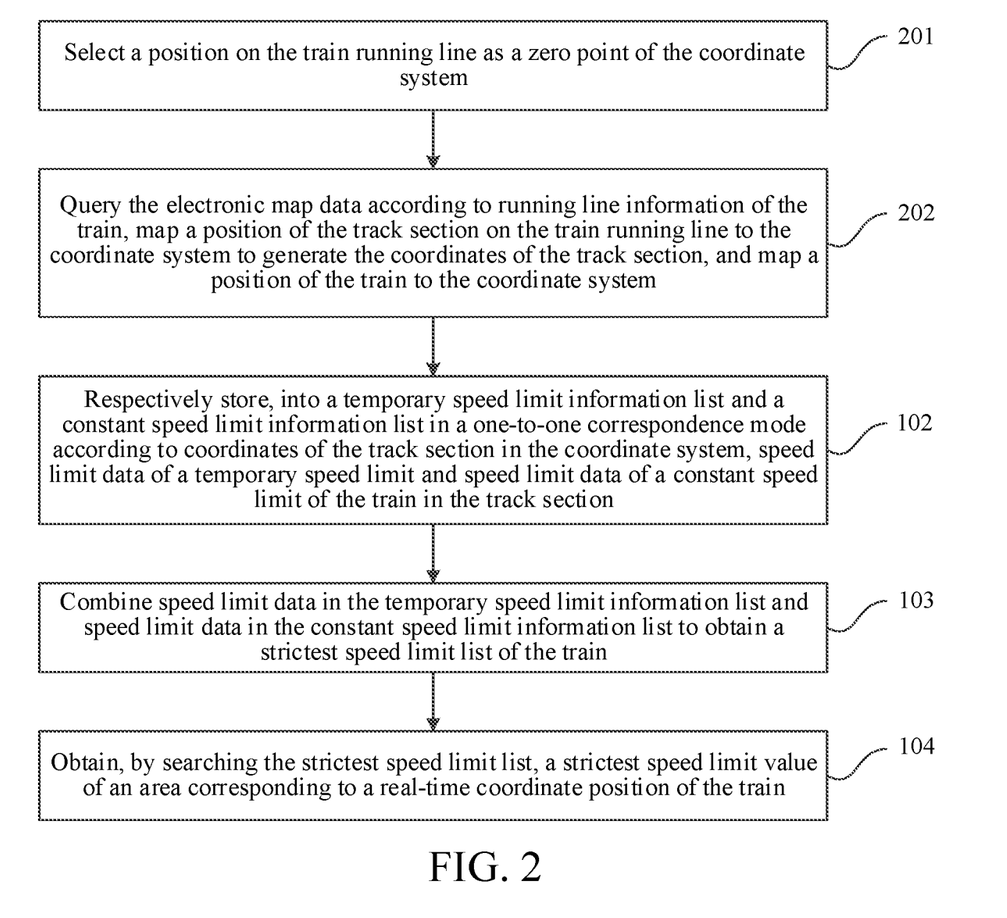
FIG. 2 is a flowchart of a method for obtaining an area speed limit value according to another embodiment of the present disclosure.

FIG. 2 is a flowchart of a method for obtaining an area speed limit value according to another embodiment of the present disclosure. As shown in FIG. 2, in the method shown in FIG. 1 of the present disclosure, Step 101 may include the following steps.

Step 201: A position on the train running line is selected as a zero point of the coordinate system.

Step 202: The electronic map data is queried according to running line information of the train, a position of the track section on the train running line of the train is mapped to the coordinate system to generate the coordinates of the track section, and a position of the train is mapped to the coordinate system.

Figure 3:
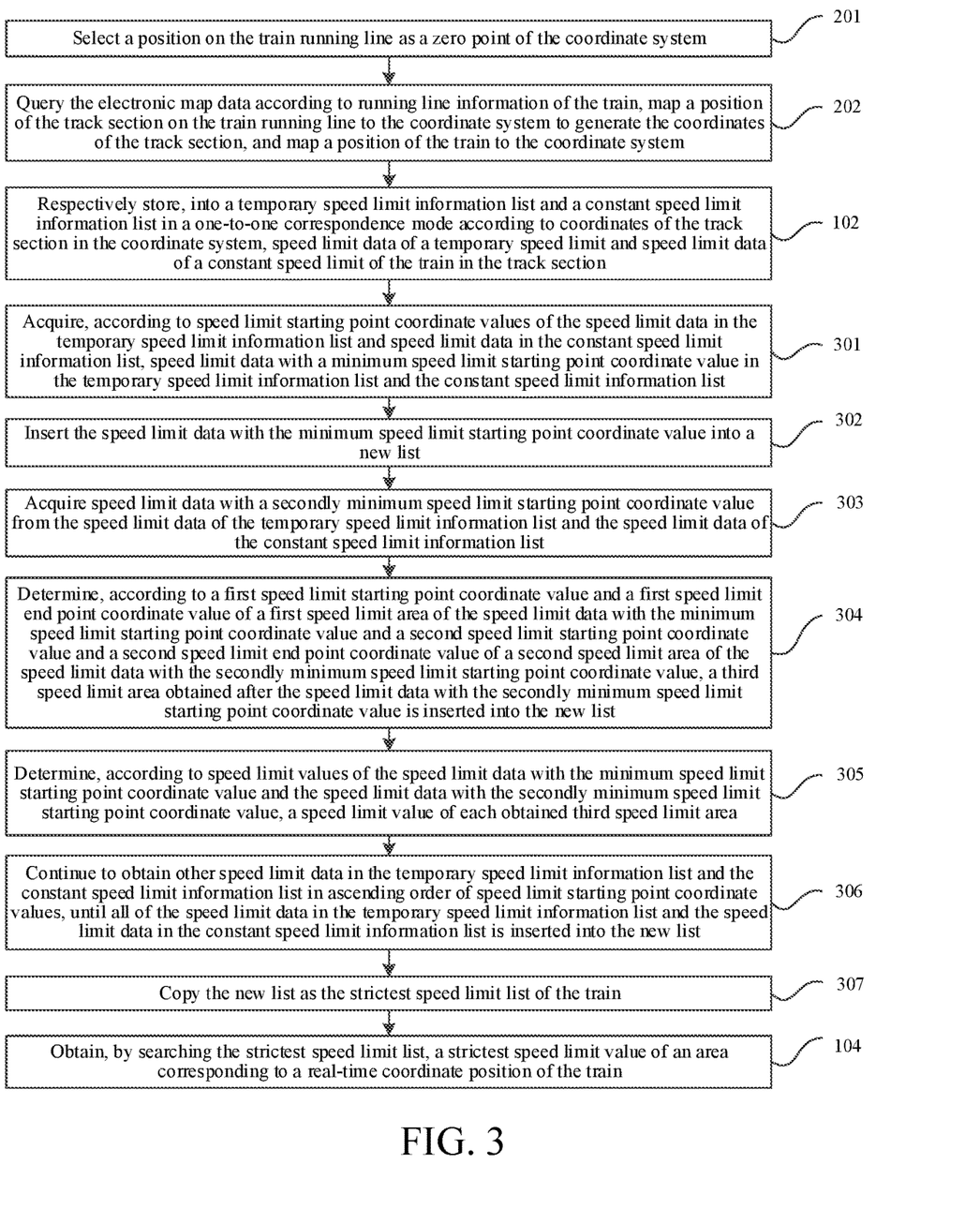
FIG. 3 is a flowchart of a method for obtaining an area speed limit value according to another embodiment of the present disclosure.

FIG. 3 is a flowchart of a method for obtaining an area speed limit value according to another embodiment of the present disclosure. As shown in FIG. 3, in the method shown in FIG. 1 of the present disclosure, Step 103 may include the following steps.

Step 301: Speed limit data with a minimum speed limit starting point coordinate value is acquired from the speed limit data in the temporary speed limit information list and the speed limit data in the constant speed limit information list according to speed limit starting point coordinate values of the speed limit data in the temporary speed limit information list and the speed limit data in the constant speed limit information list.

In an embodiment of the present invention, the temporary speed limit information list and the constant speed limit information list may be traversed, speed limit starting point coordinate values of elements in the temporary speed limit information list and the constant speed limit information list may be compared each time by starting from an index value 0, and speed limit data with a minimum starting point coordinate value is taken.

Step 302: The speed limit data with the minimum speed limit starting point coordinate value is inserted into a new list.

It should be noted that an initial new list (an original new list) is an empty table.

For example, if a starting coordinate value of a first element in the constant speed limit list is 0, a starting coordinate value of a first element in the temporary speed limit list is 8200, and 0<8200, a first speed limit area (0, 58200) corresponding to a smaller coordinate value 0 is taken as a speed limit area of a first inserted element, that is, a starting point coordinate value of the speed limit area of the first inserted element is 0, and an end point coordinate value of the speed limit region is 58200.

Step 303: Speed limit data with a secondly minimum speed limit starting point coordinate value is acquired from the speed limit data of the temporary speed limit information list and the speed limit data of the constant speed limit information list.

For example, when the speed limit data is inserted into the new list, if a first element of a constant speed limit list is inserted for the first time, it is recorded that a current constant speed limit list index is 1, and a current temporary speed limit list index is 0.

A secondly minimum coordinate value may be taken for the second time by comparison according to a stored index. A comparison value of the constant speed limit list should be a second element {58200, 14300, 1080, 0} this time, and a comparison value of the temporary speed limit list should be a first element {8200, 50000, 1860, 0} this time, so that an element {8200, 50000, 1860, 0} with a minimum starting coordinate value may be obtained this time. In other words, acquired speed limit data with a secondly minimum starting point coordinate value is {8200, 50000, 1860, 0}. A starting point coordinate value of a second speed limit area corresponding to the speed limit data is 8200, and a length of the second speed limit area is 50000, so that an end point coordinate value of the second speed limit area is 58200, that is, coordinates of the second speed limit area are (8200, 58200).

Step 304: A third speed limit area obtained after the speed limit data with the secondly minimum speed limit starting point coordinate value is inserted into the new list is determined according to a first speed limit starting point coordinate value and a first speed limit end point coordinate value of a first speed limit area of the speed limit data with the minimum speed limit starting point coordinate value and a second speed limit starting point coordinate value and a second speed limit end point coordinate value of a second speed limit area of the speed limit data with the secondly minimum speed limit starting point coordinate value.

Step 305: A speed limit value of each obtained third speed limit area is determined according to a speed limit value of the speed limit data with the minimum speed limit starting point coordinate value and a speed limit value of the speed limit data with the secondly minimum speed limit starting point coordinate value.

In particular, that a speed limit value of each obtained third speed limit area is determined according to the speed limit value of the speed limit data with the minimum speed limit starting point coordinate value and the speed limit value of the speed limit data with the secondly minimum speed limit starting point coordinate value may be: for each third speed limit area, comparing a first speed limit value of the speed limit data with the minimum speed limit starting point coordinate value in the third speed limit area to a second speed limit value of the speed limit data with the secondly minimum speed limit starting point coordinate value in the third speed limit area; and taking a relatively small speed limit value from the first speed limit value and the second speed limit value as the speed limit value of the third speed limit area.

Step 306: Other speed limit data in the temporary speed limit information list and the constant speed limit information list continues to be acquired in ascending order of speed limit starting point coordinate values, until all of the speed limit data in the temporary speed limit information list and the speed limit data in the constant speed limit information list is inserted into the new list.

Step 307: The new list is copied as the strictest speed limit list of the train.

For example, it is supposed that speed limit data in the constant speed limit information list is {{0, 58200, 2200, 0}, {58200, 14300, 1080, 0}}, and speed limit data in the temporary speed limit information list is {{8200, 50000, 1860, 0}, {58200, 4300, 1020, 0}}.

Figure 4:
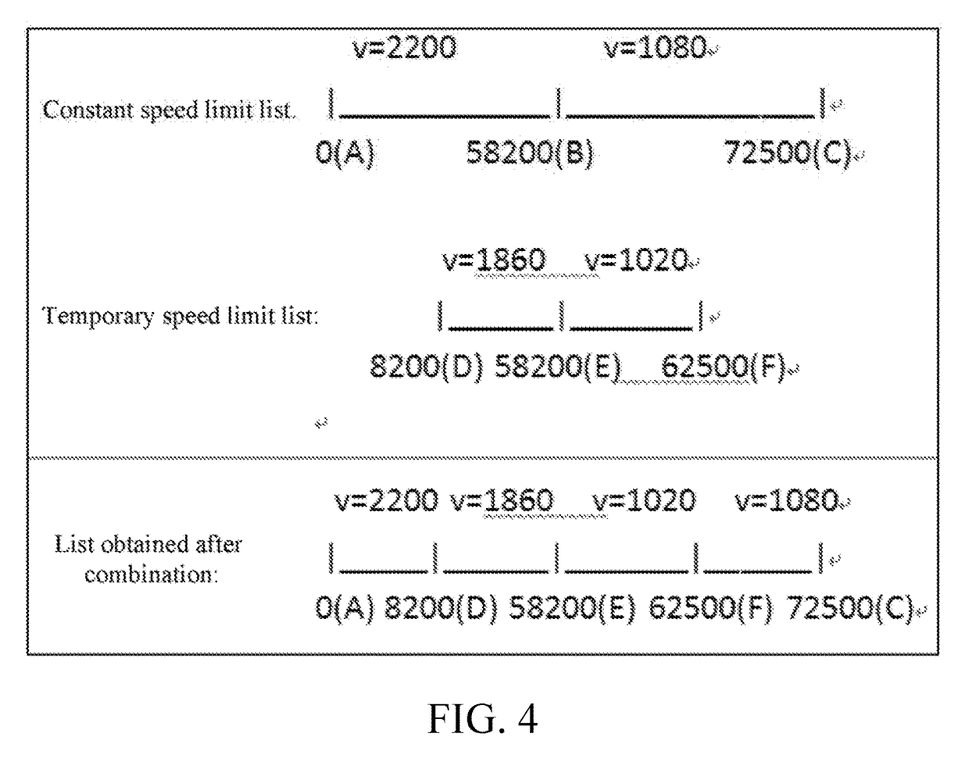
FIG. 4 is a schematic diagram of combination of a constant speed limit list with a temporary speed limit list in a method for obtaining an area speed limit value according to an embodiment of the present disclosure.

FIG. 4 is a schematic diagram of combination of a constant speed limit information list with a temporary speed limit information list in a method for obtaining an area speed limit value according to an embodiment of the present disclosure. As shown in FIG. 4, speed limit data with a minimum speed limit starting point coordinate value in the speed limit data of the temporary speed limit information list and the speed limit data of the constant speed limit information list is {0, 58200, 2200, 0}, and the speed limit data with the minimum speed limit starting point coordinate value is inserted into a new list.

Afterwards, speed limit data with a secondly minimum speed limit starting point coordinate value is acquired from the speed limit data of the temporary speed limit information list and the speed limit data of the constant speed limit information list. In one embodiment, the speed limit data with the secondly minimum speed limit starting point coordinate value is speed limit data {8200, 50000, 1860, 0} in the temporary speed limit information list.

It can be seen from FIG. 4 that a first speed limit area of speed limit data {0, 58200, 2200, 0} with a minimum speed limit starting coordinate value is (0, 58200), a first speed limit starting point coordinate value is 0, and a first speed limit end point coordinate value is 58200; and a second speed limit area of speed limit data {8200, 50000, 1860, 0} with a secondly minimum speed limit starting coordinate value is (8200, 58200), a second speed limit starting point coordinate value is 8200, and a second speed limit end point coordinate value is 58200. In this way, it may be determined that after the speed limit data {8200, 50000, 1860, 0} with the secondly minimum speed limit starting coordinate value is inserted into the new list, two third speed limit areas may be obtained, that is, (0, 8200) and (8200, 58200), which are respectively areas shown using a line segment AD and a line segment DE in a combined list of FIG. 4.

Next, speed limit values of the two third speed limit areas (0, 8200) and (8200, 58200) may be determined according to a first speed limit value 2200 in the speed limit data {0, 58200, 2200, 0} with the minimum speed limit staring point coordinate value and a second speed limit value 1860 in the speed limit data {8200, 50000, 1860, 0} with the secondly minimum speed limit staring point coordinate value. For the third speed limit area (0, 8200), the first speed limit value 2200 in the speed limit data {0, 58200, 2200, 0} with the minimum speed limit starting point coordinate value may be directly taken. For the third speed limit area (8200, 58200), because the speed limit data {8200, 50000, 1860, 0} with the secondly minimum speed limit starting point coordinate value has a relatively small speed limit value in the third speed limit area, the speed limit value of the third speed limit area (8200, 58200) is taken as 1860.

Afterwards, speed limit data in the temporary speed limit information list and speed limit data the constant speed limit information list continues to be acquired in ascending order of speed limit starting point coordinate values. In this case, because both speed limit starting point coordinate values of the speed limit data in the temporary speed limit information list and the speed limit data in the constant speed limit information list are 58200, the speed limit data in the temporary speed limit information list may be acquired, or the speed limit data in the constant speed limit information list may be acquired first, and no limitation is imposed.

As shown in FIG. 4, speed limit data in the new list obtained after final combination is {{0, 8200, 2200, 0},{8200, 50000, 1860, 0},{58200, 4300, 1020, 0},{62500, 10000, 1080, 0}}, and the speed limit data in the new list is copied to cover the speed limit data in the strictest speed limit list included in the speed limit information list, so that the strictest speed limit list of the train may be obtained.

In one embodiment, in a process of combining the temporary speed limit information list with the constant speed limit information list, a preset speed limit value (for example, 25 km/h) is taken as a speed limit value of a blank area when the blank area exists between two adjacent speed limit areas after the speed limit data of the temporary speed limit information list and the speed limit data of the constant speed limit information list is inserted into the new list, thereby ensuring continuity of the speed limit data in the strictest speed limit list.

After the method for obtaining an area speed limit value is used, when a security protection curve is calculated and logic processing is performed in any manner, a strictest speed limit value of an area corresponding to a real-time coordinate position of the train may be obtained by searching and comparing the strictest speed limit list only using the real-time coordinate position of the train. It is neither required concern whether a temporary speed limit packet is received, nor required to directly query the electronic map, thereby simplifying logical processing of electronic map data query. Therefore, a plurality of pieces of temporary speed limit data may be processed at one time, and the plurality of pieces of temporary speed limit data may be combined into the strictest speed limit list at one time, achieving high program efficiency.

Figure 5:
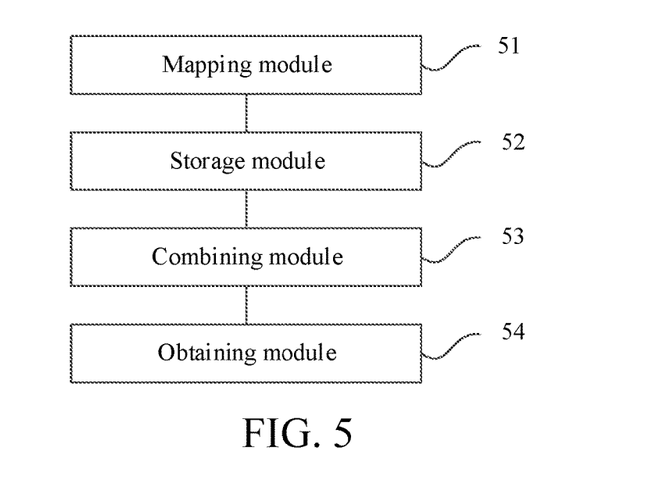
FIG. 5 is a schematic structural diagram of an apparatus for obtaining an area speed limit value according to an embodiment of the present disclosure.

FIG. 5 is a schematic structural diagram of an apparatus for obtaining an area speed limit value according to an embodiment of the present disclosure. Through the apparatus for obtaining an area speed limit value, the method for obtaining an area speed limit value provided in the embodiment of the present disclosure may be implemented. As shown in FIG. 5, the apparatus for obtaining an area speed limit value may include a mapping module 51, a storage module 52, a combining module 53, and an obtaining module 54.

The mapping module 51 is configured to map, to a coordinate system, a track section on a train running line in electronic map data.

In an embodiment of the present invention, the electronic map data may be acquired and an element that is related to the train running line and that is in the electronic map data may be mapped to the coordinate system. In particular, the element related to the train running line may include a track section. In another embodiment of the present invention, the element related to the train operation line may further include elements such as a transponder, a station, an electricity-free area, a line speed limit and a signal machine, etc.

In an embodiment of the present invention, that a track section on a train running line in electronic map data is mapped to a coordinate system includes: selecting a track section as a reference track of the coordinate system; determining a train running direction (that is, uplink or downlink) as a positive direction of the coordinate system; acquiring a specified quantity of track sections in front according to a track link relationship in the electronic map data, and calculating a starting coordinate value of each track section according to a length of the track section and the track link relationship using a starting end position of the reference track as an origin of the coordinate system. In an embodiment of the present invention, for other elements related to the train running line, starting coordinate systems, lengths, and element IDs of the other elements may be calculated according to offsets of the other elements relative to the track section, to generate an information list of all elements related to the train running line, so that the electronic map data is mapped to the coordinate system.

In addition, after the mapping module 51 maps, to the coordinate system, the track section on the train running line in the electronic map data, a list of related information is further generated. The related information list includes a track section list, a temporary speed limit information list, a constant speed limit information list, and a strictest speed limit list, which are introduced below respectively.

a. The track section list includes information such as coordinates, track section IDs, and track lengths of all track sections on the train running line. Each element in the list is represented in a form of (starting point coordinates of the track section, a track length, a track section ID, and a track attribute).

Example 1: A track section list {{0, 8600, 0x01000002, TRACK_UP}, {58200, 8600, 0x01000006, TRACK_STATION}} includes two track section elements. The track section element {0, 8600, 0x01000002, TRACK_UP} represents that a starting point coordinate of a track section is 0 cm, a track length is 8600 cm, a track section ID is 0x01000002, and a track attribute is an uplink track, the track starting point coordinate 0 representing that the track is a starting track of the coordinate system, and a starting point of the track section being an origin or a zero point of the coordinate system. The track section element {58200, 8600, 0x01000006, TRACK_STATION} represents that a starting point coordinate of the track section is 58200 cm, that is, a distance from the origin of the coordinate system is 58200 cm, a track length is 8600 cm, a track section ID is 0x01000006, and a track attribute is a station track.

b. The constant speed limit information list includes information such as speed limit area coordinates and speed limit values of all track sections on the train running line. The information is represented in a form of (starting point coordinates of a speed limit area, a length of a speed limit area, a speed limit value, and a reserved field).

Example 2: A constant speed limit information list {{0, 58200, 2200, 0}, {58200, 14300, 1080, 0}} includes two constant speed limit elements. The constant speed limit element {0, 58200, 2200, 0} represents that a starting point coordinate of a speed limit area is 0 cm, a length of the speed limit area is 58200 cm, a speed limit value of the speed limit area is 2200 cm/s, and a reserved field is 0 by default. The constant speed limit element {58200, 14300, 1080, 0} represents that a starting point coordinate of the speed limit area is 58200 cm, a length of the speed limit area is 14300 cm, a speed limit value of the speed limit area is 1080 cm/s, and a reserved field is 0 by default.

c. The temporary speed limit information list includes information such as received temporary speed limit area coordinates and temporary speed limit values. The information is represented in a form of (starting point coordinates of a temporary speed limit area, a length of the temporary speed limit area, a temporary speed limit value, and a reserved field).

Example 3: A temporary speed limit information list {{8200, 50000, 1860, 0}, {58200, 4300, 1120, 0}} includes two temporary speed limit elements. The temporary speed limit element {8200, 50000, 1860, 0} represents that a starting point coordinate of a temporary speed limit area is 8200 cm, a length of the temporary speed limit area is 50000 cm, a speed limit value of the temporary speed limit area is 1860 cm/s, and a reserved field is 0 by default. The temporary speed limit element {58200, 4300, 100, 0} represents that a starting point coordinate of the temporary speed limit region is 58200 cm, a length of the temporary speed limit area is 4300 cm, a speed limit value of the temporary speed limit area is 1080 cm/s, and a reserved field is 0 by default.

d. The strictest speed limit list includes information such as a minimum speed limit value taken from temporary speed limit data and line constant speed limit data and corresponding speed limit area coordinates of the minimum speed limit value. The information is represented in a form of (starting point coordinates of a strictest speed limit area, a length of the strictest speed limit area, a strictest speed limit value, and a reserved field).

Example 4: A strictest speed limit list {{0, 8200, 2200, 0}, {8200, 50000, 1860, 0}} includes two strictest speed limit elements. {0, 8200, 2200, 0} represents that a starting point coordinate of a strictest speed limit area is 0 cm, a length of the strictest speed limit area is 8200 cm, a speed limit value of the strictest speed limit area is 2200 cm/s, and a reserved field is 0 by default. {58200, 14300, 1080, 0} represents that a starting point coordinate of the strictest speed limit area is 8200 cm, a length of the strictest speed limit area is 50000 cm, a speed limit value of the strictest speed limit area is 1860 cm/s, and a reserved field is 0 by default. The strictest speed limit list may be a combined speed limit list, and used to include information such as a minimum speed limit value taken from the temporary speed limit data and the constant speed limit data of a line and corresponding speed limit area coordinates of the minimum speed limit value.

The storage module 52 is configured to respectively store, into a temporary speed limit information list and a constant speed limit information list in a one-to-one correspondence mode according to coordinates of the track section in the coordinate system, speed limit data of a temporary speed limit and a constant speed limit of the train in the track section. The coordinates of the track section in the coordinate system are represented in a form of (starting point coordinates of the track section, a track length, a track section ID, and a track attribute) of the track section in a track section list.

In one embodiment, the speed limit data of the temporary speed limit and the speed limit data of the constant speed limit of the track section are respectively stored into a temporary speed limit information list and a constant speed limit information list in a representation form of a coordinate system element.

A coordinate system element of the speed limit data in the temporary speed limit information list is represented in a form of (starting point coordinate values of a temporary speed limit area, a length of the temporary speed limit area, a temporary speed limit value, and a reserved field).

A coordinate system element of the speed limit data in the constant speed limit information list is represented in a form of (starting point coordinates of the speed limit area, a length of the speed limit area, a speed limit value, and a reserved field).

The combining module 53 is configured to combine speed limit data in the temporary speed limit information list with speed limit data in the constant speed limit information list to obtain a strictest speed limit list of the train.

The obtaining module 54 is configured to obtain, by searching the strictest speed limit list obtained by the combining module 53, a strictest speed limit value of an area corresponding to a real-time coordinate position of the train.

In one embodiment, after the combining module 53 obtains the strictest speed limit list of the train, the obtaining module 54 may obtain the strictest speed limit value of the area corresponding to the real-time coordinate position according to the real-time coordinate position of the train, and may further obtain a speed limit value of a safety protection curve of the train by calculating according to the obtained strictest speed limit value.

In the apparatus for obtaining an area speed limit value, the mapping module 51 preprocesses the electronic map data, and maps, to the coordinate system, the track section on the train running line in the electronic map data. Afterwards, the storage module 52 respectively stores, into the temporary speed limit information list and the constant speed limit information list in a one-to-one correspondence mode according to the coordinates of the track section in the coordinate system, the speed limit data of the temporary speed limit and the speed limit data of the constant speed limit of the train in the track section. The combining module 53 combines the speed limit data in the temporary speed limit information list with the speed limit data in the constant speed limit information list to obtain the strictest speed limit list of the train. Finally, the obtaining module 54 obtains, by searching the strictest speed limit list, the strictest speed limit value of the area corresponding to the real-time coordinate position of the train. Therefore, a plurality of pieces of temporary speed limit data may be combined into the strictest speed limit list at one time, it is neither required to concern whether a temporary speed limit packet is received, nor required to directly query the electronic map, thereby reducing complexity of logical processing, and improving program efficiency.

Figure 6:
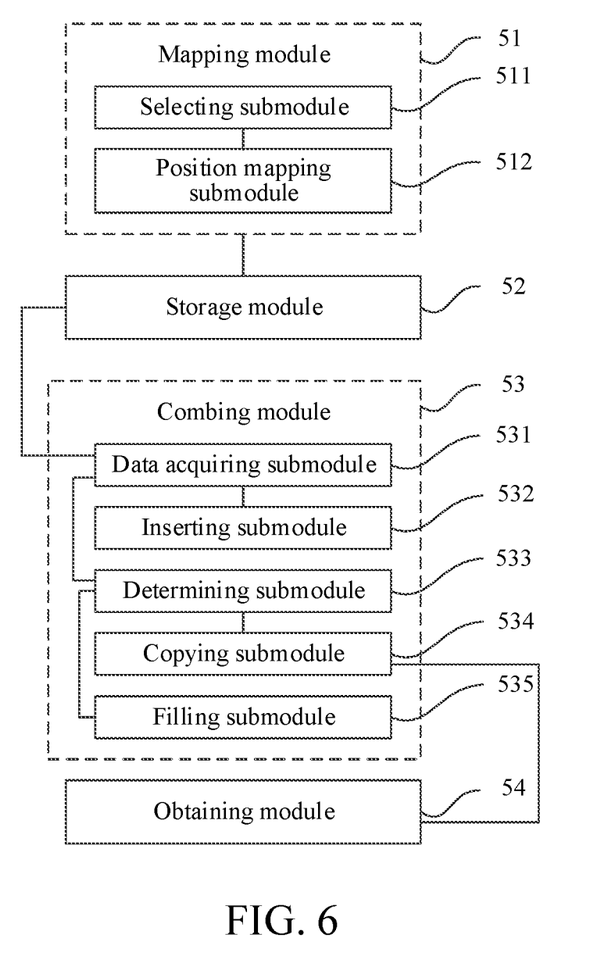
FIG. 6 is a schematic structural diagram of an apparatus for obtaining an area speed limit value according to another embodiment of the present disclosure.

FIG. 6 is a schematic structural diagram of another embodiment of an apparatus for obtaining an area speed limit value according to the present disclosure. Compared to the apparatus for obtaining an area speed limit value shown in FIG. 5, a difference lies in that, in the apparatus for obtaining an area speed limit value shown in FIG. 6, a mapping module 51 may include a selecting submodule 511 and a position mapping submodule 512.

The selecting submodule 511 is configured to select a position on the train running line as a zero point of the coordinate system.

The position mapping submodule 512 is configured to: query the electronic map data according to running line information of the train, map a position of the track section on the train running line to the coordinate system so as to generate the coordinates of the track section, and map a position of the train to the coordinate system.

In one embodiment, the combining module 53 may include a data acquiring submodule 531, an inserting submodule 532, a determining submodule 533, and a copying submodule 534.

The data acquiring submodule 531 is configured to acquire, according to speed limit starting point coordinate values of the speed limit data in the temporary speed limit information list and the speed limit data in the constant speed limit information list, speed limit data with a minimum speed limit starting point coordinate value in the speed limit data of the temporary speed limit information list and the speed limit data of the constant speed limit information list.

In an embodiment of the present invention, the data acquiring submodule 531 may traverse the temporary speed limit information list and the constant speed limit information list, and compare a speed limit starting point coordinate values of an element in the temporary speed limit information list to a speed limit starting point coordinate values of an element in the constant speed limit information list by starting from an index value 0, and take speed limit data with a minimum starting point coordinate value.

The inserting submodule 532 is configured to insert, into a new list, the speed limit data with the minimum speed limit starting point coordinate value acquired by the data acquiring submodule 531.

It should be noted that an initial new list (an original new list) is an empty table.

The data acquiring submodule 531 is further configured acquire speed limit data with a secondly minimum speed limit starting point coordinate value from the speed limit data of the temporary speed limit information list and the speed limit data of the constant speed limit information list.

The determining submodule 533 is configured to determine, according to a first speed limit starting point coordinate value and a first speed limit end point coordinate value of a first speed limit area of the speed limit data with the minimum speed limit starting point coordinate value and a second speed limit starting point coordinate value and a second speed limit end point coordinate value of a second speed limit area of the speed limit data with the secondly minimum speed limit starting point coordinate value, a third speed limit area obtained after the speed limit data with the secondly minimum speed limit starting point coordinate value is inserted into the new list.

For example, a starting coordinate value of a first element in the constant speed limit list is 0, a starting coordinate value of a first element in the temporary speed limit list is 8200, 0<8200, and 0 with a smaller coordinate value is taken, so that a starting point coordinate value of a speed limit area of the first inserted element is 0, and an end point coordinate value of the speed limit area is 58200, that is, coordinates of the first speed limit area are (0, 58200).

When speed limit data is inserted into the new list, if the first element of the constant speed limit list is inserted for the first time, it may be recorded that a currently constant speed limit list index is 1, and an index of a currently temporary speed limit list is 0.

A secondly minimum coordinate value may be taken for the second time by comparison according to a stored index. A comparison value of the constant speed limit list should be a second element {58200, 14300, 1080, 0} this time, and a comparison value of the temporary speed limit list should be a first element {8200, 50000, 1860, 0} this time, so that an element {8200, 50000, 1860, 0} with a minimum starting coordinate value may be obtained this time. In other words, acquired speed limit data with a secondly minimum starting point coordinate value is {8200, 50000, 1860, 0}. A starting point coordinate value of a second speed limit area corresponding to the speed limit data is 8200, and a length of the second speed limit area is 50000, so that an end point coordinate value of the second speed limit area is 58200, that is, coordinates of the second speed limit area are (8200, 58200).

In one embodiment, the determining submodule 533 is specifically configured to: for each third speed limit area, compare a first speed limit value of the speed limit data with the minimum speed limit starting point coordinate value in the third speed limit area to a second speed limit value of the speed limit data with the secondly minimum speed limit starting point coordinate value in the third speed limit area; and take a relatively small speed limit value from the first speed limit value and the second speed limit value as the speed limit value of the third speed limit area.

The data acquiring submodule 531 is further configured to continue to acquire other speed limit data in the temporary speed limit information list and the constant speed limit information list in ascending order of speed limit starting point coordinate values, until all of the speed limit data in the temporary speed limit information list and the speed limit data in the constant speed limit information list is inserted into the new list.

The copying submodule 534 is configured to copy the new list as the strictest speed limit list of the train.

For example, it is supposed that speed limit data in the constant speed limit information list is {{0, 58200, 2200, 0}, {58200, 14300, 1080, 0}}, and speed limit data in the temporary speed limit information list is {{8200, 50000, 1860, 0}, {58200, 4300, 1020, 0}}.

Referring to FIG. 4, speed limit data with a minimum speed limit starting point coordinate value in the speed limit data of the temporary speed limit information list and the speed limit data of the constant speed limit information list is {0, 58200, 2200, 0}, and the inserting submodule 532 first inserts the speed limit data into a new list.

Afterwards, the data acquiring submodule 531 acquires speed limit data with a secondly minimum speed limit starting point coordinate value from the speed limit data of the temporary speed limit information list and the speed limit data of the constant speed limit information list, and the speed limit data with the secondly minimum speed limit starting point coordinate value is speed limit data {8200, 50000, 1860, 0} in the temporary speed limit information list in one embodiment.

It can be seen from FIG. 4 that a first speed limit area of speed limit data {0, 58200, 2200, 0} with a minimum speed limit starting point coordinate value is (0, 58200), a first speed limit starting point coordinate value is 0, and a first speed limit end point coordinate value is 58200. A second speed limit area of speed limit data {8200, 50000, 1860, 0} with a secondly minimum speed limit starting point coordinate value is (8200, 58200), a second speed limit starting point coordinate value is 8200, and a second speed limit end point coordinate value is 58200. In this way, the determining submodule 533 may determine that after the speed limit data {8200, 50000, 1860, 0} with the secondly minimum speed limit starting point coordinate value is inserted into the new list, two third speed limit areas may be obtained, that is, (0, 8200) and (8200, 58200), which are respectively areas shown using a line segment AD and a line segment DE in a combined list of FIG. 4.

Next, the determining submodule 533 may determine speed limit values of the two third speed limit areas (0, 8200) and (8200, 58200) according to a first speed limit value 2200 in the speed limit data {0, 58200, 2200, 0} with the minimum speed limit staring point coordinate value and a second speed limit value 1860 in the speed limit data {8200, 50000, 1860, 0} with the secondly minimum speed limit staring point coordinate value. For the third speed limit area (0, 8200), the first speed limit value 2200 in the speed limit data {0, 58200, 2200, 0} with the minimum speed limit starting point coordinate value may be directly taken. For the third speed limit area (8200, 58200), because the speed limit data {8200, 50000, 1860, 0} with the secondly minimum speed limit starting point coordinate value is relatively small in speed limit values in the third speed limit area, the speed limit value of the third speed limit area (8200, 58200) is taken as 1860.

Afterwards, the data acquiring submodule 531 continues to acquire speed limit data in the temporary speed limit information list and speed limit data in the constant speed limit information list in ascending order of speed limit starting point coordinate values. In this case, because both speed limit starting point coordinate values of the speed limit data in the temporary speed limit information list and the speed limit data in the constant speed limit information list are 58200, the data acquiring submodule 531 may acquire the speed limit data in the temporary speed limit information list or first acquire the speed limit data in the constant speed limit information list, and no limitation is imposed on this in one embodiment.

As shown in FIG. 4, speed limit data in the new list obtained after final combination is {{0, 8200, 2200, 0},{8200, 50000, 1860, 0},{58200, 4300, 1020, 0},{62500, 10000, 1080, 0}}, and the copying submodule 534 copies the speed limit data in the new list to cover the speed limit data in the strictest speed limit list included in the speed limit information list, so that the strictest speed limit list of the train may be obtained.

In one embodiment, the combining module 53 may further include a filling submodule 535.

The filling submodule 535 is configured to take a preset speed limit value as a speed limit value of a blank area when the blank area exists between two adjacent speed limit areas after the speed limit data of the temporary speed limit information list and after the speed limit data of the constant speed limit information list is inserted into the new list, thereby ensuring continuity of the speed limit data in the strictest speed limit list.

After the apparatus for obtaining an area speed limit value is used, when a security protection curve is calculated and logical processing is performed, a strictest speed limit value of an area corresponding to a real-time coordinate position of the train may be obtained by searching and comparing the strictest speed limit list only using the real-time coordinate position of the train. It is neither required to concern whether a temporary speed limit packet is received, nor required to directly query the electronic map, thereby simplifying logical processing of electronic map data query. Therefore, a plurality of pieces of temporary speed limit data may be processed at one time, and the plurality of pieces of temporary speed limit data may be combined into the strictest speed limit list at one time, achieving high program efficiency.

Figure 7:
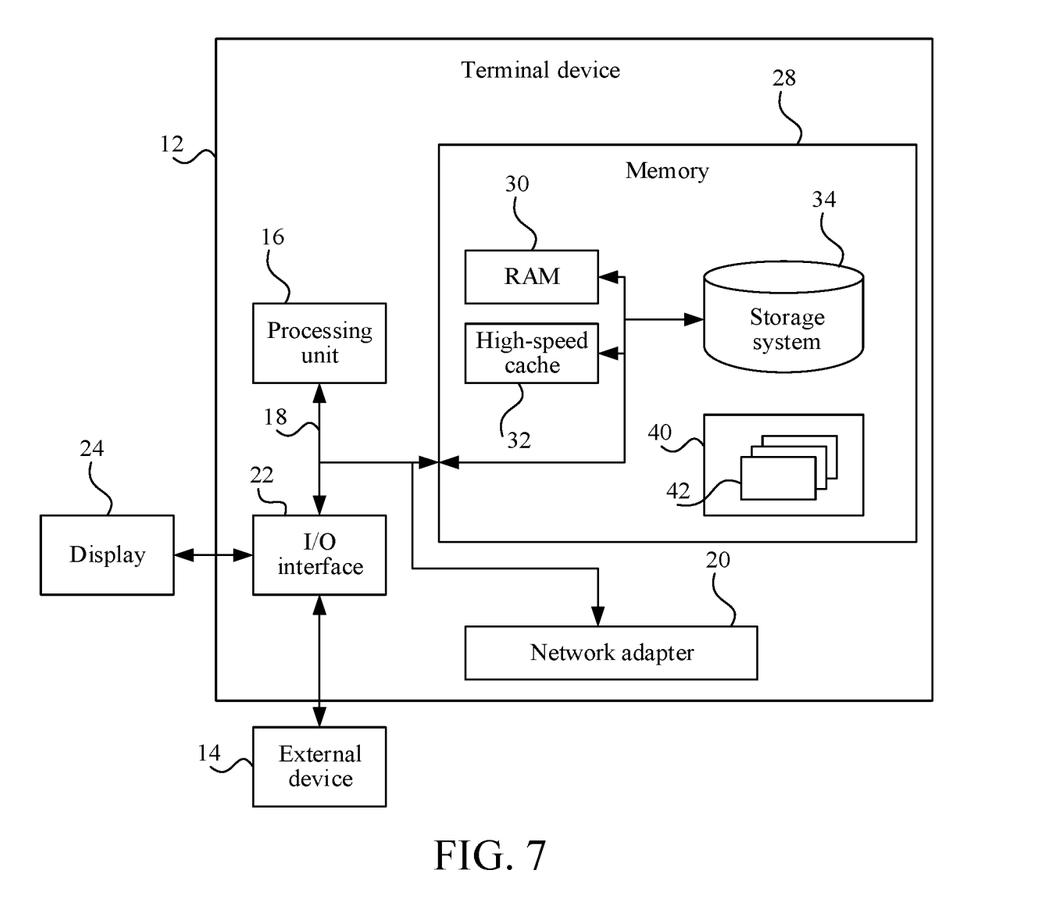
FIG. 7 is a schematic structural diagram of a terminal device according to an embodiment of the present disclosure.

FIG. 7 is a schematic structural diagram of a terminal device according to an embodiment of the present disclosure. The terminal device in one embodiment may be disposed on a train, and the terminal device includes a memory, a processor, and a computer program stored on the memory and capable of running on the processor, when the processor executes the computer program, the method for obtaining an area speed limit value provided in the embodiment of the present disclosure being implemented.

FIG. 7 shows a block diagram of an exemplary terminal device 12 configured to implement an implementation of the present disclosure. The terminal device 12 shown in FIG. 7 is merely an example and shall not impose a limitation on function or use scope in any manner.

As shown in FIG. 7, the terminal device 12 is embodied in a form of a general purpose computing device. Components of the terminal device 12 may include, but not limited to: one or more processors or processing units 16, a system memory 28, and a bus 18 connecting different system components (including the system memory 28 and the processing unit 16).

The bus 18 represents one or more of several bus structures, including a memory bus or a memory controller, a periphery bus, a graphical acceleration port, a processor or a local bus using any bus structure in a plurality of different bus structures. For example, these architectures include, but not limited to, an industry standard architecture (ISA) bus, a micro channel architecture (MAC) bus, an enhanced ISA bus, a video electronics standards association (VESA) local bus, and a peripheral component interconnect (PCI) bus.

The terminal device 12 typically includes a plurality of computer system readable media. These media may be any available medium accessible by the terminal device 12, including volatile and non-volatile media, removable and non-removable media.

The system memory 28 may include a computer system readable medium in a volatile memory form, for example, a random access memory (RAM) 30 and/or a cached memory 32. The terminal device 12 may further include other removable/non-removable, volatile/non-volatile computer system storage media. For example only, the storage system 34 may be used to read and write non-removable, non-volatile magnetic media (not shown in FIG. 7 and commonly referred to as a "hard disk drive"). Although not shown in FIG. 7, a magnetic disk drive for reading and writing a removable non-volatile magnetic disk (for example, a "floppy disk") and an optical disc drive for reading and writing a removable non-volatile optical disc (for example, a compact disc read only memory (CD-ROM), a digital video disc read only memory (DVD-ROM), or other optical media) may be provided. In these cases, each drive may be connected to the bus 18 through one or more data media interfaces. The memory 28 may include at least one program product, and the program product has a group of (for example, at least one) program modules. These program modules are configured to execute functions of the embodiments of the present disclosure.

A program/utility tool 40 having a group of (at least one) program module 42 may be stored, for example, in the memory 28. Such program module 42 includes, but not limited to: an operating system, one or more application programs, other program modules and program data. Each or certain combination of these examples may include implementation of a network environment. The program module 42 generally performs functions and/or methods in the embodiments described in the present disclosure.

The terminal device 12 may also communicate with one or more external devices 14 (for example, a keyboard, a pointing device, a display device 24, and the like), and may also communicate with one or more devices that enable a user to interact with the terminal device 12, and/or communicate with any device (for example, a network adapter, a modem, and the like) that enables the terminal device 12 to communicate with one or more other computing devices. This communication may proceed through an input/output (I/O) interface 22. Moreover, the terminal device 12 may also communicate with one or more networks (for example, a local area network (LAN), a wide area network (WAN) and/or a public network such as the Internet) through a network adapter 20. As shown in FIG. 7, the network adapter 20 communicates with other modules of the terminal device 12 through the bus 18. It should be understood that although not shown in FIG. 7, other hardware and/or software modules may be used in conjunction with the terminal device 12, including but not limited to: a microcode, a device driver, a redundancy processing unit, an external magnetic disk driving array, a RAID system, a magnetic tape drive, and a data backup storage system, and the like.

The processing unit 16 executes various function applications and data processing by executing programs stored in the system memory 28, for example, implementing the method for obtaining an area speed limit value provided in the embodiments of the present disclosure.

The present disclosure further provides a non-transitory computer-readable storage medium storing a computer program, and execution of the computer program by the processor implements the method for obtaining an area speed limit value provided in the embodiments of the present disclosure.

The non-transitory computer-readable storage medium may be any combination of one or more computer-readable media. The computer-readable medium may be a computer-readable signal medium or a computer-readable storage medium. The computer-readable storage medium may be, for example, but not limited to, an electric, magnetic, optical, electromagnetic, infrared, or semi-conductive system, apparatus, or device, or any combination thereof. More specific examples of the computer readable storage medium (a non-exhaustive list) include: an electrical connection having one or more wires, a portable computer magnetic disk, a hard disk, a random access memory (RAM), a read only memory (ROM), an erasable programmable read only memory (EPROM) or flash memory, an optical fiber, a compact disc read only memory (CD-ROM), an optical storage device, a magnetic storage device, or any appropriate combination thereof. In this file, the computer readable storage medium may be any tangible medium including or storing a program, and the program may be used by or in combination with an instruction execution system, apparatus, or device.

The computer readable signal medium may include a data signal transmitted in a baseband or as part of a carrier, and stores computer readable program code. The propagated data signal may be in a plurality of forms, including, but not limited to, an electromagnetic signal, an optical signal, or any appropriate combination thereof. The computer readable signal medium may alternatively be any computer readable medium other than the computer readable storage medium. The computer readable medium may be configured to send, propagate, or transmit a program configured to be used by or in combination with an instruction execution system, apparatus, or device.

The program code included in the computer readable medium may be transmitted by using any suitable medium, including but not limited to, via wireless transmission, a wire, a cable, radio frequency (RF) or the like, or any suitable combination of thereof.

The computer program code configured to execute the operations of the present application may be written by using one or more programming languages or a combination thereof. The programming languages include an object-oriented programming language such as Java, Smalltalk and C++, and also include a conventional procedural programming language such as "C" or similar programming languages. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a user computer through any type of network including a local area network (LAN) or a wide area network (WAN), or may be connected to an external computer (for example, through the Internet by using an Internet service provider).

An embodiment of the present disclosure further provides a computer program product, and execution of instructions in the computer program product by the processor implements the method for obtaining an area speed limit value provided in the embodiments of the present disclosure.

In description of this specification, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In the descriptions of the present disclosure, unless explicitly specified, "multiple" means at least two, for example, two or three.

Any process or method description described in a flowchart or in another manner can be understood as a module, segment, or part representing codes including one or more executable instructions for implementing specific logical functions or steps of a process. In addition, a range of preferred implementations of the present disclosure include another implementation, and functions can be executed not according to the shown or discussed sequence, including according to a basically simultaneous manner according to involved functions or an opposite sequence, which should be understood by a person skilled in the art of the embodiments of the present invention.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the specification of the present disclosure, the "computer readable medium" may be any apparatus that can include, store, communicate, propagate, or transmit programs to be used by the instruction execution system, apparatus or device or to be used in combination with the instruction execution system, apparatus or device. More specific examples of the computer readable medium (a non-exhaustive list) include: an electronic connection (an electronic device) with one or more wires, a portable computer enclosure (a magnetic device), a random access memory (RAM), a read only memory (ROM), an erasable programmable read only memory (EPROM) or a flash memory, an optical fiber device and a portable compact disc read only memory (CD-ROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It should be understood that parts of the present disclosure may be implemented by using hardware, software, firmware, or combinations thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, functional units in the embodiments of the present disclosure may be integrated into one processing module, or each of the units may exist alone physically, or two or more units are integrated into one module. The integrated module may be implemented in a hardware form, or may be implemented in a form of a software functional module. If implemented in the form of software functional modules and sold or used as an independent product, the integrated module may also be stored in a computer-readable storage medium.

The aforementioned storage medium may be a read-only memory, a magnetic disk, or an optical disc. Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A method for obtaining an area speed limit value, comprising:

mapping, to a coordinate system, a track section on a train running line in electronic map data;

storing, respectively into a temporary speed limit information list and a constant speed limit information list in a one-to-one correspondence mode, speed limit data of a temporary speed limit and speed limit data of a constant speed limit of the train in the track section according to coordinates of the track section in the coordinate system;

combining speed limit data in the temporary speed limit information list with speed limit data of the constant speed limit information list to obtain a strictest speed limit list of the train; and obtaining, by searching the strictest speed limit list, a strictest speed limit value of an area corresponding to a real-time coordinate position of the train, wherein the combining speed limit data in the temporary speed limit information list with speed limit data of the constant speed limit information list to obtain a strictest speed-limit list of the train comprises:

acquiring, according to speed limit starting point coordinate values of the speed limit data in the temporary speed limit information list and the speed limit data in the constant speed limit information list, speed limit data with a minimum speed limit starting point coordinate value from the speed limit data in the temporary speed limit information list and the speed limit data in the constant speed limit information list;

inserting, into a new list, the speed limit data with the minimum speed limit starting point coordinate value;

acquiring speed limit data with a secondly minimum speed limit starting point coordinate value from the speed limit data of the temporary speed limit information list and the speed limit data of the constant speed limit information list;

determining, according to a first speed limit starting point coordinate value and a first speed limit end point coordinate value that are in a first speed limit area of the speed limit data with the minimum speed limit starting point coordinate value and a second speed limit starting point coordinate value and a second speed limit end point coordinate value that are in a second speed limit area of the speed limit data with the secondly minimum speed limit starting point coordinate value, a third speed limit area obtained after the speed limit data with the secondly minimum speed limit starting point coordinate value is inserted into the new list;

determining, according to a speed limit value of the speed limit data with the minimum speed limit starting point coordinate value and a speed limit value of the speed limit data with the secondly minimum speed limit starting point coordinate value, a speed limit value of each obtained third speed limit area;

continuing to acquire other speed limit data in the temporary speed limit information list and other speed limit data in the constant speed limit information list in ascending order of speed limit starting point coordinate values, until all of the speed limit data in the temporary speed limit information list and the speed limit data in the constant speed limit information list is inserted into the new list; and copying the new list as the strictest speed limit list of the train.

2. The method according to claim 1, wherein the determining, according to a speed limit value of the speed limit data with the minimum speed limit starting point coordinate value and a speed limit value of the speed limit data with the secondly minimum speed limit starting point coordinate value, a speed limit value of each obtained third speed limit area comprises:

for each third speed limit area, comparing a first speed limit value of the speed limit data with the minimum speed limit starting point coordinate value in the third speed limit area to a second speed limit value of the speed limit data with the secondly minimum speed limit starting point coordinate value in the third speed limit area; and taking a smaller speed limit value from the first speed limit value and the second speed limit value as the speed limit value of the third speed limit area.

3. The method according to claim 1, further comprising:
taking a preset speed limit value as a speed limit value of a blank area when the blank area exists between two adjacent speed limit areas after the speed limit data of the temporary speed limit information list and the speed limit data of the constant speed limit information list is inserted into the new list.

4. An apparatus for obtaining an area speed limit value, comprising:
a memory for storing a computer program and a processor for executing the compute program,
wherein the processor comprises:
a mapping module, configured to map, to a coordinate system, a track section on a train running line in electronic map data;
a storing module, configured to respectively store, into a temporary speed limit information list and a constant speed limit information list in a one-to-one correspondence mode, speed limit data of a temporary speed limit and speed limit data of a constant speed limit of the train in the track section according to coordinates of the track section in the coordinate system;
a combining module, configured to combine speed limit data in the temporary speed limit information list and speed limit data in the constant speed limit information list to obtain a strictest speed limit list of the train; and
an obtaining module, configured to obtain, by searching the strictest speed limit list obtained by the combining module, a strictest speed limit value of an area corresponding to a real-time coordinate position of the train,
wherein the combining module comprises:
a data acquiring submodule, configured to acquire, according to speed limit starting point coordinate values of the speed limit data in the temporary speed limit information list and the speed limit data in the constant speed limit information list, speed limit data with a minimum speed limit starting point coordinate value in the temporary speed limit information list and the constant speed limit information list;
an inserting submodule, configured to insert, into a new list, the speed limit data that has the minimum speed limit starting point coordinate value and that is acquired by the data acquiring submodule,
wherein the data acquiring submodule is further configured to acquire the speed limit data with a secondly minimum speed limit starting point coordinate value from the speed limit data of the temporary speed limit information list and the constant speed limit information list;
a determining submodule, configured to determine, according to a first speed limit starting point coordinate value and a first speed limit end point coordinate value that are in a first speed limit area of the speed limit data with the minimum speed limit starting point coordinate value and a second speed limit starting point coordinate value and a second speed limit end point coordinate value that are in a second speed limit area of the speed limit data with the secondly minimum speed limit starting point coordinate value, a third speed limit area obtained after the speed limit data with the secondly minimum speed limit starting point coordinate value is inserted into the new list; and determine, according to a speed limit value in the speed limit data with the minimum speed limit starting point coordinate value and a speed limit value in the speed limit data with the secondly minimum speed limit starting point coordinate value, a speed limit value of each obtained third speed limit area,
wherein the data acquiring submodule is further configured to continue to acquire other speed limit data in the temporary speed limit information list and the constant speed limit information list in ascending order of speed limit starting point coordinate values, until all of the speed limit data in the temporary speed limit information list and the constant speed limit information list is inserted into the new list; and
a copying submodule, configured to copy the new list as the strictest speed limit list of the train.

5. The apparatus according to claim 4, wherein:
the determining submodule is specifically configured to:
for each third speed limit area, compare a first speed limit value of the speed limit data with the minimum speed limit starting point coordinate value in the third speed limit area to a second speed limit value of the speed limit data with the secondly minimum speed limit starting point coordinate value in the third speed limit area; and take a smaller speed limit value from the first speed limit value and the second speed limit value as the speed limit value of the third speed limit area.

6. The apparatus according to claim 4, wherein the combining module further comprises:

a filling submodule configured to take a preset speed limit value as a speed limit value of a blank area when the blank area exists between two adjacent speed limit areas after the speed limit data of the temporary speed limit information list and speed limit data of the constant speed limit information list is inserted into the new list.

7. A non-transitory computer readable storage medium storing a computer program for, when the computer program is executed by a processor, performing a method for obtaining an area speed limit value, the method comprising:
mapping, to a coordinate system, a track section on a train running line in electronic map data;
storing, respectively into a temporary speed limit information list and a constant speed limit information list in a one-to-one correspondence mode, speed limit data of a temporary speed limit and speed limit data of a constant speed limit of the train in the track section according to coordinates of the track section in the coordinate system;
combining speed limit data in the temporary speed limit information list with speed limit data of the constant speed limit information list to obtain a strictest speed limit list of the train; and
obtaining, by searching the strictest speed limit list, a strictest speed limit value of an area corresponding to a real-time coordinate position of the train,
wherein the combining speed limit data in the temporary speed limit information list with speed limit data of the constant speed limit information list to obtain a strictest speed-limit list of the train comprises:
acquiring, according to speed limit starting point coordinate values of the speed limit data in the temporary speed limit information list and the speed limit data in the constant speed limit information list, speed limit data with a minimum speed limit starting point coordinate value from the speed limit data in the temporary speed limit information list and the speed limit data in the constant speed limit information list;
inserting, into a new list, the speed limit data with the minimum speed limit starting point coordinate value;
acquiring speed limit data with a secondly minimum speed limit starting point coordinate value from the speed limit data of the temporary speed limit information list and the speed limit data of the constant speed limit information list;
determining, according to a first speed limit starting point coordinate value and a first speed limit end point coordinate value that are in a first speed limit area of the speed limit data with the minimum speed limit starting point coordinate value and a second speed limit starting point coordinate value and a second speed limit end point coordinate value that are in a second speed limit area of the speed limit data with the secondly minimum speed limit starting point coordinate value, a third speed limit area obtained after the speed limit data with the secondly minimum speed limit starting point coordinate value is inserted into the new list;
determining, according to a speed limit value of the speed limit data with the minimum speed limit starting point coordinate value and a speed limit value of the speed limit data with the secondly minimum speed limit starting point coordinate value, a speed limit value of each obtained third speed limit area;
continuing to acquire other speed limit data in the temporary speed limit information list and other speed limit data in the constant speed limit information list in ascending order of speed limit starting point coordinate values, until all of the speed limit data in the temporary speed limit information list and the speed limit data in the constant speed limit information list is inserted into the new list; and
copying the new list as the strictest speed limit list of the train.

8. The non-transitory computer readable storage medium according to claim 7, wherein the determining, according to a speed limit value of the speed limit data with the minimum speed limit starting point coordinate value and a speed limit value of the speed limit data with the secondly minimum speed limit starting point coordinate value, a speed limit value of each obtained third speed limit area comprises:
for each third speed limit area, comparing a first speed limit value of the speed limit data with the minimum speed limit starting point coordinate value in the third speed limit area to a second speed limit value of the speed limit data with the secondly minimum speed limit starting point coordinate value in the third speed limit area; and
taking a smaller speed limit value from the first speed limit value and the second speed limit value as the speed limit value of the third speed limit area.

9. The non-transitory computer readable storage medium according to claim 7, the method further comprising:
taking a preset speed limit value as a speed limit value of a blank area when the blank area exists between two adjacent speed limit areas after the speed limit data of the temporary speed limit information list and the speed limit data of the constant speed limit information list is inserted into the new list.

* * * * *